(12) United States Patent
Takabatake et al.

(10) Patent No.: US 7,247,699 B2
(45) Date of Patent: Jul. 24, 2007

(54) PROCESS FOR PURIFICATION OF CRUDE POLYETHER AND ADSORBENT

(75) Inventors: Harumi Takabatake, Sakaide (JP); Tsutomu Nosu, Sakaide (JP)

(73) Assignee: Kyowa Chemical Industry Co., Ltd., Kagawa (JP)

( * ) Notice: Subject to any disclaimer, the term of this patent is extended or adjusted under 35 U.S.C. 154(b) by 344 days.

(21) Appl. No.: 10/486,402

(22) PCT Filed: Jun. 7, 2003

(86) PCT No.: PCT/JP03/07685

§ 371 (c)(1), (2), (4) Date: Feb. 11, 2004

(87) PCT Pub. No.: WO03/106535

PCT Pub. Date: Dec. 24, 2003

(65) Prior Publication Data

US 2004/0192884 A1    Sep. 30, 2004

(30) Foreign Application Priority Data

Jun. 18, 2002    (JP) .............................. 2002-177315

(51) Int. Cl.
*C08G 63/00*    (2006.01)
(52) U.S. Cl. ...................... 528/480; 528/421; 528/482; 436/120; 436/126; 556/445
(58) Field of Classification Search ................ 528/421, 528/480, 482; 536/120, 126; 556/445
See application file for complete search history.

(56) References Cited

U.S. PATENT DOCUMENTS 4,507,475 A * 3/1985 Straehle et al. ............. 536/120
6,048,821 A    4/2000 Demmel et al.
6,281,164 B1 * 8/2001 Demmel et al. ............. 502/439

FOREIGN PATENT DOCUMENTS

| JP | 53-96098 | 8/1978 |
|---|---|---|
| JP | 2-64007 | 3/1990 |
| JP | 4-362011 | 12/1992 |
| JP | 7-258403 | 10/1995 |
| JP | 2000-154245 | 6/2000 |

* cited by examiner

*Primary Examiner*—Terressa Boykin
(74) *Attorney, Agent, or Firm*—Wenderoth, Lind & Ponack, L.L.P.

(57) ABSTRACT

A process for purifying a crude polyether, comprising contacting a crude polyether obtained by addition polymerizing an active hydrogen-containing compound with an alkylene oxide compound in the presence of an alkali metal-containing basic catalyst to an adsorbent comprising a synthesized hydrous magnesium silicate compound which satisfies the following requirements (1) to (5) in order to reduce the alkali metal content of the crude polyether: (1) it is represented by the following formula I:

$$(CaO)_x \cdot (MgO)_y \cdot (Al_2O_3)_z \cdot SiO_2 \cdot mH_2O \quad I$$

wherein x, y, z and m satisfy the following ranges:
$x < y$, $z < y$, $0 \leq x \leq 0.1$, $0.6 \leq y \leq 0.6$, $0 \leq z \leq 0.1$ and $0.1 \leq m \leq 1.5$, (2) it is amorphous according to the analysis of its powder method X-ray diffraction diagram, (3) it has a BET specific surface area of 100 to 400 m²/g, (4) it has an alkali metal content of 0.1 wt % or less, and (5) it has an average particle diameter of 2 to 60 μm. According to the present invention, a purified polyether having an extremely low content of an alkali metal can be obtained effectively.

12 Claims, No Drawings

PROCESS FOR PURIFICATION OF CRUDE POLYETHER AND ADSORBENT

DETAILED DESCRIPTION OF THE INVENTION

The present invention relates to a crude polyether purification process and an adsorbent which can be used in the process.

Along with progress in the chemical industry, it is strongly desired to remove toxic trace components contained in a chemical product efficiently in order to improve the quality of the product. The toxic trace components include impurities such as a catalyst used for synthesis and an inorganic acid, organic acid or alkaline substance which remains as a by-product formed by a reaction. Further, impurities such as an organic acid formed by the oxidation of oil and a bad odor emitted from food are also included as impurities contained in used cooking oil. Neutralization, distillation, extraction and the like are generally used to remove these toxic components. A process using an adsorbent is preferred as it is simple. The present invention relates to an adsorbent which can be used in this simple process for removing a toxic component by adsorption. More specifically, it relates to a process for purifying a crude polyether produced in the presence of an alkali metal-containing catalyst.

DESCRIPTION OF THE PRIOR ART

A crude polyether which is obtained by addition polymerizing an active hydrogen compound with an alkylene oxide compound in the presence of an alkali metal-containing catalyst needs to be purified to such an extent that the amount of the residual catalyst after purification is infinitely close to nil. To this end, an adsorbent is needed 10 times more than the alkali catalyst. Therefore, a reduction in yield and a large amount of waste resulting from the adsorption of the polyether to the adsorbent become big problems from the viewpoints of operation efficiency and environmental load. To solve these problems, JP-A 53-96098 (the term "JP-A" as used herein means an unexamined published Japanese patent applications) proposes a process for purifying a crude polyether by containing 0.5 to 2.0 wt % of water in the crude polyether, adding synthesized magnesium silicate or synthesized aluminum silicate to the crude polyether and filtering the resulting mixture. Further, JP-A 7-258403 discloses that a crude polyether obtained by addition polymerizing alkylene oxide in the presence of a basic catalyst is purified by adding and mixing water and magnesium silicate having a sodium content of 0.5 wt % or less. JP-A 2000-154245 discloses a process for purifying crude polyoxyalkylene polyol by using magnesium silicate having a specific surface area of 600 to 1,200 m²/g and a pore diameter of 40 to 100 Å as an adsorbent.

PROBLEMS TO BE SOLVED BY THE INVENTION

A polyether has a wide application range such as polyurethanes, surfactants, cosmetics and lubricating oils. Along with the expansion of the application range of the polyether, its output is becoming higher and its production equipment is becoming larger in size.

Meanwhile, the consumption of an adsorbent for the purification of a crude polyether is growing. Generally used adsorbents include synthesized products such as molecular sieves, active alumina, synthesized magnesium silicate, synthesized aluminum silicate and activated carbon, and natural products and processed products thereof such as acidic clay and active clay. However, these adsorbents are expensive for their adsorptivity and have low adsorptivity, resulting in a large amount of waste and low product yield. Therefore, an adsorbent having high adsorptivity is still in need. Waste containing a polyether, such as adsorbed substances and treated liquids must be neutralized or incinerated, and it is difficult to find a place for the disposal of the waste. Accordingly, the consumption of the adsorbent must be significantly reduced.

MEANS FOR SOLVING THE PROBLEM

Then, the inventors of the present invention have conducted studies to develop an adsorbent which has high adsorptivity for an alkali metal-containing catalyst contained in a crude polyether, can reduce the amount of the catalyst with a small amount thereof and makes it possible to obtain a polyether having an extremely low content of an alkali metal-containing catalyst.

As a result, they have found that a synthesized amorphous magnesium silicate having a predetermined alkali metal content or less through an ion exchange treatment, a BET specific surface area within a specific range and an average particle diameter within a specific range has extremely high adsorptivity for an alkali metal-containing catalyst contained in a crude polyether and have thus accomplished the present invention.

The present invention which is accomplished from above studies, is a process for purifying a crude polyether, comprising contacting a crude polyether obtained by addition polymerizing an active hydrogen-containing compound with an alkylene oxide compound in the presence of an alkali metal-containing basic catalyst to an adsorbent comprising a synthesized hydrous magnesium silicate compound which satisfies the following requirements (1) to (5) in order to reduce the alkali metal content of the crude polyether:

(1) it is represented by the following formula I:

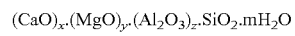

$$(CaO)_x \cdot (MgO)_y \cdot (Al_2O_3)_z \cdot SiO_2 \cdot mH_2O \qquad \text{I}$$

wherein x, y, z and m satisfy the following ranges:
$x<y$, $z<y$, $0 \leq x \leq 0.1$, $0.06 \leq y \leq 0.6$, $0 \leq z \leq 0.1$ and $0.1 \leq m \leq 1.5$, (2) it is amorphous according to the analysis of its powder method X-ray diffraction diagram,
(3) it has a BET specific surface area of 100 to 400 m²/g,
(4) it has an alkali metal content of 0.1 wt % or less, and
(5) it has an average particle diameter of 2 to 60 μm.

The synthesized hydrous magnesium silicate compound used as an adsorbent in the purification process of the present invention has characteristic properties satisfying all the above requirements (1) to (5).

The content of an alkali metal contained in a magnesium silicate compound synthesized by a conventionally known process can be reduced to a certain extent by rinsing with water but it is extremely difficult to reduce the content of an alkali metal to 0.1 wt % or less. Although the content of an alkali metal in a synthesized amorphous magnesium silicate compound can be greatly reduced by heating and crystallizing it, the BET specific surface area of the compound is increased to about 600 m²/g or more by crystallization. According to knowledge acquired by the inventors of the present invention, particles of the crystallized magnesium silicate compound having a BET specific surface area of about 600 m²/g or more have the effect of adsorbing a catalyst contained in a crude polyether in some measure. However, an adsorbent having improved adsorptivity has been desired.

Although the magnesium silicate compound of the present invention is amorphous and has a BET specific surface area of 100 to 400 m²/g, it is superior in adsorptivity to a crystalline magnesium silicate compound having a BET specific surface area of about 600 m²/g or more.

The amorphous magnesium silicate compound used in the purification process of the present invention and a process for preparing the compound will be described in detail hereinbelow.

The magnesium silicate compound of the present invention is represented by the following formula I as described above.

$$(CaO)_x \cdot (MgO)_y \cdot (Al_2O_3)_z \cdot SiO_2 \cdot mH_2O \qquad I$$

wherein x, y, z and m satisfy the following ranges:
x<y, z<y, 0≦x≦0.1, 0.06≦y≦0.6, 0≦z≦0.1 and 0.1≦m≦1.5.

In the above formula, preferred x, y, z and m satisfy the following ranges:
x<y, z<y, 0≦x<0.05, 0.12<y<0.25, 0≦z<0.05 and 0.1≦m≦1.5.

The magnesium silicate compound of the present invention is amorphous according to the analysis of its powder method X-ray diffraction diagram and has a specific surface area measured by the BET method of 100 to 400 m²/g, preferably 150 to 350 m²/g. As the magnesium silicate compound of the present invention is used a magnesium silicate compound whose alkali metal content has been reduced to 0.1 wt % or less, preferably 0.08 wt % or less by an ion exchange treatment with the contained alkali metal after synthesis. Although the content of the alkali metal can be greatly reduced by the ion exchange treatment, the lower limit thereof is generally 0.001 wt %, substantially 0.003 wt %. The magnesium silicate compound has an average particle diameter of 2 to 60 μm, preferably 5 to 40 μm.

The adsorbent of the present invention can be synthesized by the following process. However, the process and conditions are not particularly limited if a hydrous magnesium silicate compound which satisfies the above requirements (1) to (5) is obtained.

The hydrous magnesium silicate compound of the present invention can be synthesized by reacting a water-soluble magnesium compound with a water-soluble silicate compound, optionally using an inorganic acid for adjusting pH. Examples of the water-soluble magnesium compound include magnesium chloride, magnesium sulfate and magnesium nitrate, and examples of the water-soluble silicate compound include alkali silicates such as sodium silicate represented by the general formula Na₂O.nSiO₂ (n=2 to 4) generally called "water-glass", sodium metasilicate, sodium orthosilicate and potassium silicate. No. 3 water-glass is particularly preferred. An aluminum (Al) compound such as aluminum sulfate, aluminum chloride, aluminum nitrate or alkali aluminate may be used. Examples of the inorganic acid include hydrochloric acid, sulfuric acid and nitric acid.

The reaction may be a batch reaction which is carried out by introducing a predetermined amount of an aqueous solution of a silicate compound as a solution A into a reactor and injecting a mixed aqueous solution of a magnesium compound and optionally an aluminum compound and an inorganic acid in a predetermined ratio as a solution B into the reactor at a fixed rate, or a continuous reaction which is carried out by continuously injecting the solution A and the solution B in a predetermined ratio into a reactor containing water in order to obtain a reaction suspension of a magnesium silicate compound. The continuous reaction is advantageous from the viewpoint of production efficiency. The aqueous solutions of an aluminum compound and an inorganic acid contained in the solution B may be injected into the reactor separately.

The reaction temperature is not particularly limited but may be about 15 to 60° C. The reaction pH is adjusted to 7 to 11, preferably 8 to 10.5.

The obtained reaction suspension is subjected to solid-liquid separation and rinsed with water, followed by an ion exchange reaction. The ion exchange treatment is important to improve the adsorptivity of the adsorbent by reducing the alkali metal content of the reaction product to 0.1 wt % or less.

The ion exchange treatment is carried out by contacting the synthesized magnesium silicate compound to an aqueous solution of at least one salt selected from the group consisting of a water-soluble magnesium salt, water-soluble aluminum salt and water-soluble calcium salt (may be simply referred to as "salt aqueous solution" hereinafter). More specifically, to carry out the ion exchange treatment, a product obtained by subjecting the reaction suspension to solid-liquid separation, rinsing with water and dehydration is re-emulsified in the salt aqueous solution to carry out an ion exchange reaction, or the reaction suspension is cleaned with the salt aqueous solution to carry out an ion exchange reaction simultaneously with solid-liquid separation with a drum filter.

Ion exchangeability between an alkali metal and a metal salt contained in the salt aqueous solution is affected by pH at the time of the treatment. When pH is 11 or higher, ion exchange becomes difficult, thereby reducing adsorptivity and when the reaction pH is 7 or lower, the alkali metal is readily ion exchanged but adsorptivity lowers. Therefore, the reaction must be carried out by adjusting pH to 7 to 11, preferably 8 to 10.5. After ion exchange, the content of the alkali metal is 0.1 wt % or less, preferably 0.08 wt % or less, more preferably 0.06 wt % or less. The salt aqueous solution used is not particularly limited but preferably an aqueous solution of a water-soluble metal salt, more preferably Mg, Ca or Al compound, particularly preferably a chloride, sulfate or nitrate. The ion exchange treatment may be carried out by the following method, for example.

To re-emulsify the product obtained by subjecting the reaction suspension to solid-liquid separation, rinsing with water and dehydrating in the aqueous solution of the (above) water-soluble metal salt for ion exchange, the content of the water-soluble metal salt is adjusted to 0.028 to 0.07 mol/l and 2 to 5 equivalents based on the alkali contained in solid matter. When the content is 1 equivalent, ion exchange cannot be carried out fully and when the content is 6 equivalents or more, the amount to be ion exchanged remains unchanged. As the concentration of the aqueous solution of the water-soluble metal salt becomes higher, the content of Cl⁻, SO₄²⁻ or NO₃⁻ in the suspension increases and remains in the product as an impurity. The structural change to crystalline of magnesium silicate is caused by a hydrothermal treatment. According to its X-ray diffraction diagram, a sepiolite peak is observed at around 100° C. or higher. Although magnesium silicate is amorphous at 100° C. or below according to its X-ray diffraction diagram, the specific surface area measured by the BET method increases, from which it is assumed that crystal growth begins. Therefore, the ion exchange treatment must be carried out at a low temperature and re-emulsification is carried out at room temperature to 60° C., preferably room temperature to 30° C.

To clean the reaction suspension with the aqueous solution of the water-soluble metal salt for ion exchange simultaneously with solid-liquid separation with a drum filter, the water-soluble metal salt is used in an amount of 0.1 to 0.5 mol/l, preferably 0.2 to 0.4 mol/l which is 15 to 30 times the weight of solid matter contained in a cake. When the content of the water-soluble metal salt is low, ion exchange cannot be carried out fully and when the content is high, $Cl^-$, $SO_4^{2-}$ or $NO_3^-$ remains in the product as an impurity. The liquid temperature of the aqueous solution of the water-soluble metal salt is 5 to 60° C., preferably 5 to 30° C. The ion exchange is not limited by these.

After the ion exchange treatment, the product is rinsed with water to remove an unrequired salt, dehydrated and dried. For drying, there may be employed shelf type drying in which the dehydrated cake is placed on a pan and dried with dry air, or spray drying in which the dehydrated cake is re-emulsified to a concentration of 100 g/l to 500 g/l in terms of a product and optionally the emulsion is treated with a colloid mill, to uniform the shape of the dried product and then sprayed into a high-temperature tank. After drying, it may be ground or classified before use. Although the ground product is slightly superior in adsorptivity, a product obtained by spray drying is superior in separation and removal after adsorption. Therefore, spherical particles of the synthesized hydrous magnesium silicate compound obtained by spray drying are generally used. A conventional filter may be used for separation after adsorption. For example, a precoat layer such as a diatomaceous earth precoat layer is formed and filtered, or a filter press is used for pressure filtration.

The synthesized hydrous magnesium silicate compound of the present invention which is obtained by the above process is amorphous according to its powder method X-ray diffraction diagram. The BET specific surface area of the compound varies according to reaction conditions. When the reaction pH is high, the BET value becomes small and when the reaction pH is low, the BET value becomes large. The BET value is also affected by temperature. That is, when the reaction temperature is high or a thermal aging treatment is carried out, the BET specific surface area can be increased to 600 $m^2/g$ or more but the adsorptivity of an alkali metal deteriorates. Although the reason for this is unknown, it is considered that the structural change of the synthesized hydrous magnesium silicate compound is caused by heating though its powder method X-ray diffraction diagram shows that it is amorphous. The synthesized hydrous magnesium silicate compound of the present invention has a BET specific surface area of 100 to 400 $m^2/g$, preferably 150 to 350 $m^2/g$.

The synthesized hydrous magnesium silicate compound of the present invention is extremely useful as an adsorbent used for the purification of a crude polyether produced in the presence of an alkali metal-containing catalyst. That is, the polyether is obtained by addition polymerizing an active hydrogen compound with an alkylene oxide compound in the presence of an alkali metal-containing catalyst, for example, an alkali metal hydroxide such as caustic potash or caustic soda, alkali metal alcoholate such as potassium methylate or sodium methylate, alkali metal alone such as metal potassium or metal sodium, or a mixture of two or more thereof. The thus produced crude polyether contains an alkali metal catalyst in an amount of several hundreds to several tens of thousand ppm. This catalyst can be effectively adsorbed and removed by the adsorbent of the present invention.

Examples of the active hydrogen compound include alcohols such as methanol, ethanol, butanol, higher alcohols, ethylene glycol, propylene glycol, glycerin, sorbitol, pentaerythritol, methyl glycoside and sugars, phenols such as phenol, alkylphenols and bisphenol A, and amines such as ethylenediamine, alkylethylenediamines, isopropanolamine and ethanolamine. Examples of the alkylene oxide include ethylene oxide and propylene oxide.

In order to adsorb and remove the residual alkali metal catalyst contained in the crude polyether, the synthesized hydrous magnesium silicate compound of the present invention is added to and mixed with the crude polyether as an adsorbent and the adsorbent is separated and removed to obtain a purified polyether. The amount of the adsorbent, which changes according to the amount of the residual alkali metal catalyst, is 0.1 to 10 wt %, preferably 0.5 to 5 wt % based on the crude polyether. As for the treatment conditions which do not differ from those of the conventional process, preferably, the treatment temperature is 70 to 150° C. and the treatment time is 5 minutes to 2 hours under agitation. For adsorption, water may be added. In this case, it is preferably added in an amount of 0.5 to 3 wt % based on the crude polyether. Before adsorption, an antioxidant may be contained in the crude polyether to prevent deterioration.

Although the alkali metal catalyst contained in the crude polyether can be removed by the adsorbent of the present invention, at least one of an inorganic acid, inorganic acid salt and organic acid such as phosphoric acid, sulfuric acid, sodium hydrogen pyrophosphate and oxalic acid is added before the addition of the adsorbent to cause a neutralization reaction, and, the adsorbent is generally added after the end of the neutralization reaction.

A specimen prepared by adding a suitable amount of caustic potash as the residual catalyst to a commercially available purified polyether or dipropylene glycol may be used in an adsorption test in place of the crude polyether.

EXAMPLES

The following examples are provided for the purpose of further illustrating the present invention but are in no way to be taken as limiting.

In Examples, the BET specific surface area and the average particle diameter were measured by the following methods.

BET Specific Surface Area Measuring Method: 0.2 g of the synthesized hydrous magnesium silicate compound as an adsorbent of the present invention was placed in a cell, the inside pressure of the vessel was reduced to 100 mm Torr or less to carry out deaeration at 105° C. for 30 minutes, and then the specific surface area of the compound was measured by the BET method using the NOVA2000 device of QUANTA CHROME Co., Ltd.

Average particle diameter measuring method: This was measured using the LA-910 laser diffraction/scattering particle size distribution measuring instrument of HORIBA Co., Ltd.

Production Example of Crude Polyether

After 92 parts of glycerin and 8 parts of potassium hydroxide were fed to an autoclave and the inside of the autoclave was substituted by nitrogen, 3,050 parts of propylene oxide was supplied into the autoclave at 100 to 120° C. to carry out a reaction at a maximum reaction pressure of not higher than 0.5 MPa. The content of KOH in the obtained crude polyether was 2,400 ppm.

Example 1

(Synthesis Test) An aqueous solution of magnesium sulfate having a concentration of 1.3 mols/l, an aqueous solution of sulfuric acid having a concentration of 1.3 mols/l and an aqueous solution of No. 3 water-glass containing 0.7 mols/l of $Na_2O$ and 2.1 mols/l of $SiO_2$ were prepared, 500 ml of water was fed to a 1-liter stainless steel reactor by a downtake pipe, and the above solutions were supplied into the reactor at flow rates of 5.5 ml/min, 4.5 ml/min and 21.3 ml/min by a quantitative pump under agitation, respectively, to carry out a reaction continuously at room temperature for 5 hours. The pH of the obtained slurry was 8.9. This slurry was dehydrated by sucking with a Nutsche funnel to form a cake which was then cleaned with an aqueous solution of magnesium sulfate having a concentration of 0.3 mol/l in an amount 20 times the weight of solid matter contained in the cake so as to remove sodium through ion exchange and rinsed with ion exchange water in an amount 20 times the weight of the solid matter. The obtained cleaned cake was re-emulsified to a concentration of 200 g/l in terms of solid matter and dried with a spray drier for laboratory use.

When the dried product was analyzed, it had a BET specific surface area of 308 $m^2$/g, a Na content of 0.05 wt % and an average particle diameter of 45 μm and was composed of $(MgO)_{0.19}.SiO_2.1.1H_2O$. Its powder method X-ray diffraction diagram showed that it was amorphous.

(Adsorption Test 1) 100 g of a crude polyether was fed to a 200-ml beaker and heated on a hot plate under agitation while the inside of the beaker was substituted by nitrogen, 1 g of ion exchange water was supplied into the beaker when the liquid temperature reached 90±2° C., and further 1 g of the synthesized adsorbent was added after 5 minutes and stirred for 30 minutes to carry out an adsorption test. Right after adsorption, the adsorbent was separated by suction-filteration to obtain an almost achromatic transparent liquid. The content of potassium in the filtrate was measured by potential difference titration at room temperature. As a result, the content of K was 8.5 ppm.

(Adsorption Test 2) 100 g of a crude polyether was fed to a 200-ml beaker and heated on a hot plate under agitation while the inside of the beaker was substituted by nitrogen, 1 g of ion exchange water was supplied into the beaker when the liquid temperature reached 90±2° C., and further 3 g of the synthesized adsorbent was added after 5 minutes and treated completely in the same manner as in the above adsorption test 1. As a result, the content of potassium in the filtrate was 0.2 ppm.

Example 2

(Synthesis Test) The cake which was cleaned by rinsing with water after ion exchange in Example 1 was dried in an oven at 60° C. for 20 hours and ground with a hammer mill for laboratory use to prepare an evaluation sample. When the sample was analyzed, it had a BET specific surface area of 161 $m^2$/g, a Na content of 0.06 wt % and an average particle diameter of 15 μm and was composed of $(MgO)_{0.19}.SiO_2.1.0H_2O$. Its powder method X-ray diffraction diagram showed that it was amorphous.

(Adsorption Test 1) When an adsorption test was carried out completely in the same manner as the adsorption test 1 of Example 1, the content of potassium in the filtrate was 0.9 ppm.

(Adsorption Test 2) When an adsorption test was carried out completely in the same manner as the adsorption test 2 of Example 1, the content of potassium in the filtrate was 0.1 ppm.

Comparative Example 1

(Synthesis Test) A comparative sample was prepared completely in the same manner as in Example 1 except that the reaction slurry synthesized in Example 1 was not ion exchanged with an aqueous solution of magnesium sulfate and cleaned with ion exchange water in an amount 20 times the weight of solid matter contained in the cake. When the obtained sample was analyzed, it had a BET specific surface area of 92 $m^2$/g, a Na content of 2.0 wt % and an average particle diameter of 43 μm and was composed of $(MgO)_{0.15}.SiO_2.0.92H_2O$. Its powder method X-ray diffraction diagram showed that it was amorphous.

(Adsorption Test 1) When an adsorption test was carried out completely in the same manner as the adsorption test 1 of Example 1, the content of potassium in the filtrate was 24.5 ppm.

(Adsorption Test 2) When an adsorption test was carried out completely in the same manner as the adsorption test 2 of Example 1, the content of potassium in the filtrate was 2.3 ppm.

Comparative Example 2

(Synthesis Test) A cake obtained by ion exchanging the reaction slurry synthesized in Example 1 with an aqueous solution of magnesium sulfate was re-emulsified with ion exchange water to a concentration of 100 g/l in terms of solid content to obtain 1 liter of a slurry. This slurry was heated at 120° C. for 2 hours under agitation, sucked and filtered with a Nutsche, cleaned with ion exchange water in an amount 20 times the weight of solid matter contained in the cake, re-emulsified to a concentration of 100 g/l and dried with a spray drier for laboratory use. When powder method X-ray diffraction measurement was made on the obtained sample, a sepiolite structure diffraction diagram was obtained though it was weak. When the sample was analyzed, it had a BET specific surface area of 580 $m^2$/g, a Na content of 0.02 wt % and an average particle diameter of 49 μm and was composed of $(MgO)_{0.16}.SiO_2.0.5H_2O$.

(Adsorption Test 1) When an adsorption test was carried out completely in the same manner as the adsorption test 1 of Example 1, the content of potassium in the filtrate was 27.2 ppm.

(Adsorption Test 2) When an adsorption test was carried out completely in the same manner as the adsorption test 2 of Example 1, the content of potassium in the filtrate was 5.8 ppm.

Example 3

(Synthesis Test) An aqueous solution of magnesium sulfate having a concentration of 1.37 mols/l, an aqueous solution of hydrochloric acid having a concentration of 1.19 mols/l and an aqueous solution of No. 3 water-glass containing 0.56 mol/l of $Na_2O$ and 1.73 mols/l of $SiO_2$ were prepared, 500 ml of water was fed to a 1-liter stainless steel reactor by a downtake pipe, and the above solutions were supplied into the reactor at flow rates of 3.86 ml/min, 8.87 ml/min and 18.93 ml/min by a quantitative pump under agitation, respectively, to carry out a reaction continuously at room temperature for 5 hours. The pH of the obtained slurry was 9.0. This slurry was dehydrated by sucking with a Nutsche to form a cake which was then cleaned with an aqueous solution of calcium chloride having a concentration of 0.2 mol/l in an amount 20 times the weight of solid matter contained in the cake to remove sodium through ion exchange and then rinsed with ion exchange water in an amount 20 times the weight of the solid matter. The obtained cleaned cake was dried in an oven at 60° C. for 20 hours and ground with a hammer mill for laboratory use to prepare an evaluation sample.

When the obtained sample was analyzed, it had a BET specific surface area of 104 $m^2/g$, a Na content of 0.01 wt % and an average particle diameter of 17 μm and was composed of $(CaO)_{0.03}(MgO)_{0.13} \cdot SiO_2 \cdot 1.0H_2O$. Its powder method X-ray diffraction diagram showed that it was amorphous.

(Adsorption Test 1) When an adsorption test was carried out completely in the same manner as the adsorption test 1 of Example 1, the content of potassium in the filtrate was 1.2 ppm.

(Adsorption Test 2) When an adsorption test was carried out completely in the same manner as the adsorption test 2 of Example 1, the content of potassium in the filtrate was 0.2 ppm.

Example 4

(Synthesis Test) An aqueous solution of magnesium sulfate having a concentration of 1.4 mols/l and an aqueous solution of No. 3 water-glass containing 0.6 mol/l of $Na_2O$ and 1.7 mols/l of $SiO_2$ were prepared, 500 ml of water was fed to a 1-liter stainless steel reactor by a downtake pipe, and the above solutions were supplied into the reactor at flow rates of 19.64 ml/min and 49.03 ml/min by a quantitative pump under agitation, respectively, to carry out a reaction continuously at room temperature for 5 hours. The pH of the obtained slurry was 8.9. This slurry was dehydrated by sucking with a Nutsche to form a cake which was then cleaned with an aqueous solution of magnesium sulfate having a concentration of 0.3 mol/l in an amount 20 times the weight of solid matter contained in the cake to remove sodium through ion exchange and rinsed with ion exchange water in an amount 20 times the weight of the solid matter. The obtained cleaned cake was re-emulsified to a concentration of 200 g/l in terms of solid matter and dried with a spray drier for laboratory use.

When the obtained dried product was analyzed, it had a BET specific surface area of 318 $m^2/g$, a Na content of 0.05 wt % and an average particle diameter of 46 μm and was composed of $(MgO)_{0.31} \cdot SiO_2 \cdot 1.4H_2O$. Its powder method X-ray diffraction diagram showed that it was amorphous.

(Adsorption Test 1) When an adsorption test was carried out completely in the same manner as the adsorption test 1 of Example 1, the content of potassium in the filtrate was 9.2 ppm.

(Adsorption Test 2) When an adsorption test was carried out completely in the same manner as the adsorption test 2 of Example 1, the content of potassium in the filtrate was 0.3 ppm.

Example 5

(Synthesis Test) The cake which was ion exchanged and cleaned by rinsing with water in Example 4 was dried in an oven at 60° C. for 20 hours and ground with a hammer mill for laboratory use to prepare an evaluation sample. When the sample was analyzed, it had a BET specific surface area of 171 $m^2/g$, a Na content of 0.06 wt % and an average particle diameter of 18 μm and was composed of $(MgO)_{0.31} \cdot SiO_2 \cdot 1.3H_2O$. Its powder method X-ray diffraction diagram showed that it was amorphous.

(Adsorption Test 1) When an adsorption test was carried out completely in the same manner as the adsorption test 1 of Example 1, the content of potassium in the filtrate was 1.4 ppm.

(Adsorption Test 2) When an adsorption test was carried out completely in the same manner as the adsorption test 2 of Example 1, the content of potassium in the filtrate was 0.2 ppm.

Comparative Example 3

(Synthesis Test) A comparative sample was prepared completely in the same manner as in Example 5 except that the reaction slurry synthesized in Example 5 was not ion exchanged with an aqueous solution of magnesium sulfate and was cleaned with ion exchange water in an amount 20 times the weight of solid matter contained in the cake. When the sample was analyzed, it had a BET specific surface area of 228 $m^2/g$, a Na content of 1.5 wt % and an average particle diameter of 14 μm and was composed of $(MgO)_{0.28} \cdot SiO_2 \cdot 1.2H_2O$. Its powder method X-ray diffraction diagram showed that it was amorphous.

(Adsorption Test 1) When an adsorption test was carried out completely in the same manner as the adsorption test 1 of Example 1, the content of potassium in the filtrate was 15.2 ppm.

(Adsorption Test 2) When an adsorption test was carried out completely in the same manner as the adsorption test 2 of Example 1, the content of potassium in the filtrate was 1.6 ppm.

Comparative Example 4

(Synthesis Test) A comparative sample was prepared completely in the same manner as in Example 5 except that the reaction slurry synthesized in Example 5 was not ion exchanged with an aqueous solution of magnesium sulfate and was cleaned with ion exchange water in an amount 50 times the weight of solid matter contained in the cake. When the sample was analyzed, it had a BET specific surface area of 235 $m^2/g$, a Na content of 1.04 wt % and an average particle diameter of 13 μm and was composed of $(MgO)_{0.28} \cdot SiO_2 \cdot 1.2H_2O$. Its powder method X-ray diffraction diagram showed that it was amorphous.

(Adsorption Test 1) When an adsorption test was carried out completely in the same manner as the adsorption test 1 of Example 1, the content of potassium in the filtrate was 14.8 ppm.

(Adsorption Test 2) When an adsorption test was carried out completely in the same manner as the adsorption test 2 of Example 1, the content of potassium in the filtrate was 1.5 ppm.

Example 6

(Synthesis Test) A mixed solution of 0.23 liter of an aqueous solution of magnesium sulfate having a concentration of 1.3 mols/l, 0.03 liter of an aqueous solution of aluminum sulfate having a concentration of 1.0 mol/l and 0.74 liter of ion exchange water and an aqueous solution of No. 3 water-glass containing 0.37 mol/l of $Na_2O$ and 1.11 mols/l of $SiO_2$ were prepared, 500 ml of water was fed to a 1-liter stainless steel reactor by a downtake pipe, and the above solutions were supplied into the reactor at flow rates of 10.0 ml/min and 10.7 ml/min by a quantitative pump under agitation, respectively, to carry out a reaction continuously at room temperature for 5 hours. The pH of the obtained slurry was 9.1. This slurry was dehydrated by sucking with a Nutsche to form a cake which was then cleaned with an aqueous solution of magnesium chloride having a concentration of 0.3 mol/l in an amount 20 times the weight of solid matter contained in the cake so as to remove sodium through ion exchange and rinsed with ion exchange water in an amount 20 times the weight of the solid matter. The obtained cleaned cake was re-emulsified to a concentration of 200 g/l in terms of solid matter and dried with a spray drier for laboratory use.

When the obtained dried product was analyzed, it had a BET specific surface area of 257 $m^2/g$, a Na content of 0.07 wt % and an average particle diameter of 44 μm and was composed of $(MgO)_{0.24} \cdot (Al_2O_3)_{0.024} \cdot SiO_2 \cdot 1.2H_2O$. Its powder method X-ray diffraction diagram showed that it was amorphous.

(Adsorption Test 1) When an adsorption test was carried out completely in the same manner as the adsorption test 1 of Example 1, the content of potassium in the filtrate was 8.9 ppm.

(Adsorption Test 2) When an adsorption test was carried out completely in the same manner as the adsorption test 2 of Example 1, the content of potassium in the filtrate was 0.3 ppm.

Comparative Example 5

(Synthesis Test) An aqueous solution of magnesium sulfate having a concentration of 1.3 mols/l, an aqueous solution of sulfuric acid having a concentration of 1.7 mols/l and an aqueous solution of No. 3 water-glass containing 0.7 mol/l of $Na_2O$ and 2.2 mols/l of $SiO_2$ were prepared, 500 ml of water was fed to a 1-liter stainless steel reactor by a downtake pipe, and the above solutions were fed to the reactor at flow rates of 1.57 ml/min, 8.4 ml/min and 23.37 ml/min by a quantitative pump under agitation, respectively, to carry out a reaction continuously for 5 hours. The pH of the obtained slurry was 8.5. This slurry was dehydrated by sucking with a Nutsche to form a cake which was then cleaned with an aqueous solution of magnesium sulfate having a concentration of 0.3 mol/l in an amount 20 times the weight of solid matter contained in the cake so as to remove sodium through ion exchange and rinsed with ion exchange water in an amount 20 times the weight of the solid matter. The obtained cleaned cake was dried in an oven at 60° C. for 20 hours and ground with a hammer mill for laboratory use to prepare an evaluation sample. When the obtained dried product was analyzed, it had a BET specific surface area of 485 $m^2/g$, a Na content of 0.01 wt % and an average particle diameter of 13 μm and was composed of $(MgO)_{0.043} \cdot SiO_2 \cdot 0.6H_2O$. Its powder method X-ray diffraction diagram showed that it was amorphous.

(Adsorption Test 1) When an adsorption test was carried out completely in the same manner as the adsorption test 1 of Example 1, the content of potassium in the filtrate was 20.5 ppm.

(Adsorption Test 2) When an adsorption test was carried out completely in the same manner as the adsorption test 2 of Example 1, the content of potassium in the filtrate was 4.3 ppm.

Comparative Example 6

(Synthesis Test) An aqueous solution of magnesium sulfate having a concentration of 1.3 mols/l, an aqueous solution of caustic soda having a concentration of 3.5 mols/l and an aqueous solution of No. 3 water-glass containing 0.7 mol/l of $Na_2O$ and 2.2 mols/l of $SiO_2$ were prepared, 500 ml of water was fed to a 1-liter stainless steel reactor by a downtake pipe, and the above solutions were fed to the reactor at flow rates of 17.3 ml/min, 12.2 ml/min and 3.8 ml/min by a quantitative pump under agitation, respectively, to carry out a reaction continuously for 5 hours. The pH of the obtained slurry was 9.5. This slurry was dehydrated by sucking with a Nutsche to form a cake which was then cleaned with an aqueous solution of magnesium sulfate having a concentration of 0.3 mol/l in an amount 20 times the weight of solid matter contained in the cake so as to remove sodium through ion exchange and rinsed with ion exchange water in an amount 20 times the weight of the solid matter. The obtained cleaned cake was dried in an oven at 60° C. for 20 hours and ground with a hammer mill for laboratory use to prepare an evaluation sample. When the obtained dried product was analyzed, it had a BET specific surface area of 100 $m^2/g$, a Na content of 0.06 wt % and an average particle diameter of 20 μm and was composed of $(MgO)_{0.83} \cdot SiO_2 \cdot 1.6H_2O$. Its powder method X-ray diffraction diagram showed that it was amorphous.

(Adsorption Test 1) When an adsorption test was carried out completely in the same manner as the adsorption test 1 of Example 1, the content of potassium in the filtrate was 14.5 ppm.

(Adsorption Test 2) When an adsorption test was carried out completely in the same manner as the adsorption test 2 of Example 1, the content of potassium in the filtrate was 1.4 ppm.

Comparative Example 7

A commercially available adsorbent A was used as a comparative sample. When it was analyzed, it had a BET specific surface area of 172 $m^2/g$, a Na content of 1.6 wt % and an average particle diameter of 42 μm and was composed of $(MgO)_{0.27} \cdot SiO_2 \cdot 1.1H_2O$.

(Adsorption Test 1) When an adsorption test was carried out completely in the same manner as the adsorption test 1 of Example 1, the content of potassium in the filtrate was 26.0 ppm.

(Adsorption Test 2) When an adsorption test was carried out completely in the same manner as the adsorption test 2 of Example 1, the content of potassium in the filtrate was 2.8 ppm.

Comparative Example 8

A commercially available adsorbent B was used as a comparative sample. When it was analyzed, it had a BET specific surface area of 568 $m^2/g$, a Na content of 0.08 wt % and an average particle diameter of 10 μm and was composed of $(MgO)_{0.61} \cdot SiO_2 \cdot 0.85H_2O$.

(Adsorption Test 1) When an adsorption test was carried out completely in the same manner as the adsorption test 1 of Example 1, the content of potassium in the filtrate was 33.0 ppm.

(Adsorption Test 2) When an adsorption test was carried out completely in the same manner as the adsorption test 2 of Example 1, the content of potassium in the filtrate was 10.1 ppm.

Comparative Example 9

A commercially available adsorbent C was used as a comparative sample. When it was analyzed, it had a BET specific surface area of 502 m$^2$/g, a Na content of 0.41 wt % and an average particle diameter of 51 μm and was composed of $(MgO)_{0.38} \cdot SiO_2 \cdot 1.1H_2O$.

(Adsorption Test 1) When an adsorption test was carried out completely in the same manner as the adsorption test 1 of Example 1, the content of potassium in the filtrate was 35.2 ppm.

(Adsorption Test 2) When an adsorption test was carried out completely in the same manner as the adsorption test 2 of Example 1, the content of potassium in the filtrate was 12.1 ppm.

EFFECT OF THE INVENTION

According to the present invention, a catalyst which remains in a crude polyether produced by using an alkaline compound as a catalyst can be removed efficiently and economically and the amount of an adsorbent can be reduced. In the current situation on environmental influences, all possible economical effects such as a reduction in energy consumption, a solution to a waste disposal plant problem and the like can be provided by enhancing adsorptivity. The purified polyether treated with the adsorbent of the present invention can be suitably used as a raw material for foamed polyurethanes, resins, surfactants and cosmetics.

The invention claimed is:

1. A process for purifying a crude polyether, comprising contacting a crude polyether obtained by addition polymerizing an active hydrogen-containing compound with an alkylene oxide compound in the presence of an alkali metal-containing basic catalyst to an adsorbent comprising a synthesized hydrous magnesium silicate compound which satisfies the following requirements (1) to (5) in order to reduce the alkali metal content of the crude polyether:

(1) it is represented by the following formula I:

$$(CaO)_x \cdot (MgO)_y \cdot (Al_2O_3)_z \cdot SiO_2 \cdot mH_2O \qquad I$$

wherein x, y, z and m satisfy the following ranges:
x<y, z<y, 0≦x≦0.1, 0.06≦y≦0.6, 0≦z≦0.1 and 0.1≦m≦1.5, (2) it is amorphous according to the analysis of its powder method X-ray diffraction diagram, (3) it has a BET specific surface area of 100 to 400 m$^2$/g, (4) it has an alkali metal content of 0.1 wt % or less, and (5) it has an average particle diameter of 2 to 60 μm.

2. The process for purifying a crude polyether according to claim 1, wherein in the formula I of the synthesized hydrous magnesium silicate compound, x, y, z and m satisfy the following ranges:
x<y, z<y, 0≦x<0.05, 0.12<y<0.25, 0≦z<0.05 and 0.1≦m≦1.5.

3. The process for purifying a crude polyether according to claim 1, wherein the synthesized hydrous magnesium silicate compound has a BET specific surface area of 150 to 350 m$^2$/g.

4. The process for purifying a crude polyether according to claim 1, wherein the synthesized hydrous magnesium silicate compound has an alkali metal content of 0.08 wt % or less.

5. The process for purifying a crude polyether according to claim 1, wherein the synthesized hydrous magnesium silicate compound has an average particle diameter of 5 to 40 μm.

6. The process for purifying a crude polyether according to claim 1, wherein the synthesized hydrous magnesium silicate compound is obtained by reacting a water-soluble magnesium salt with a sodium silicate and contacting the obtained magnesium silicate to an aqueous solution of at least one salt selected from the group consisting of a water-soluble magnesium salt, water-soluble aluminum salt and water-soluble calcium salt.

7. An adsorbent comprising a synthesized hydrous magnesium silicate compound which satisfies the following requirements (1) to (5):

(1) it is represented by the following formula I:

$$(CaO)_x \cdot (MgO)_y \cdot (Al_2O_3)_z \cdot SiO_2 \cdot mH_2O \qquad I$$

wherein x, y, z and m satisfy the following ranges:
x<y, z<y, 0≦x≦0.1, 0.06≦y≦0.6, 0≦z≦0.1 and 0.1≦m≦1.5, (2) it is amorphous according to the analysis of its powder method X-ray diffraction diagram, (3) it has a BET specific surface area of 100 to 400 m$^2$/g, (4) it has an alkali metal content of 0.1 wt % or less, and (5) it has an average particle diameter of 2 to 60 μm.

8. The adsorbent according to claim 7, wherein in the formula I of the synthesized hydrous magnesium silicate compound, x, y, z and m satisfy the following ranges:
x<y, z<y, 0≦x<0.05, 0.12<y<0.25, 0≦z<0.05 and 0.1≦m≦1.5.

9. The adsorbent according to claim 7, wherein the synthesized hydrous magnesium silicate compound has a BET specific surface area of 150 to 350 m$^2$/g.

10. The adsorbent according to claim 7, wherein the synthesized hydrous magnesium silicate compound has an alkali metal content of 0.08 wt % or less.

11. The adsorbent according to claim 7, wherein the synthesized hydrous magnesium silicate compound has an average particle diameter of 5 to 40 μm.

12. The adsorbent according to claim 7, wherein the synthesized hydrous magnesium silicate compound is obtained by contacting an aqueous solution of at least one salt selected from the group consisting of a water-soluble magnesium salt, water-soluble aluminum salt and water-soluble calcium salt after synthesis.

* * * * *

UNITED STATES PATENT AND TRADEMARK OFFICE
CERTIFICATE OF CORRECTION

PATENT NO.       : 7,247,699 B2
APPLICATION NO. : 10/486402
DATED            : July 24, 2007
INVENTOR(S)      : Harumi Takabatake et al.

Page 1 of 1

It is certified that error appears in the above-identified patent and that said Letters Patent is hereby corrected as shown below:

On the title page, item (22), change the PCT filing date to --Jun. 17, 2003--.

Signed and Sealed this

Thirteenth Day of November, 2007

JON W. DUDAS
*Director of the United States Patent and Trademark Office*